United States Patent
Martin et al.

(10) Patent No.: US 11,033,932 B2
(45) Date of Patent: *Jun. 15, 2021

(54) TOP COATED AND POWDER COATED ARTICLE

(71) Applicant: BTD Wood Powder Coating, Inc., Brainerd, MN (US)

(72) Inventors: Craig A. Martin, Hugo, MN (US); Craig Fast, Big Lake, MN (US); Clint Ellenberg, Dallas, TX (US)

(73) Assignee: BTD Wood Powder Coating, Inc., Brainerd, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/931,210

(22) Filed: May 13, 2020

(65) Prior Publication Data
US 2020/0269277 A1    Aug. 27, 2020

Related U.S. Application Data

(60) Continuation of application No. 15/170,520, filed on Jun. 1, 2016, now Pat. No. 10,843,226, which is a
(Continued)

(51) Int. Cl.
*B32B 21/00* (2006.01)
*B32B 21/02* (2006.01)
(Continued)

(52) U.S. Cl.
CPC ........... *B05D 7/536* (2013.01); *B05D 3/067* (2013.01); *B05D 3/12* (2013.01); *B05D 5/00* (2013.01);
(Continued)

(58) Field of Classification Search
CPC ......... B32B 21/02; B32B 21/08; B32B 21/12; Y10T 428/24066; Y10T 428/24132;
(Continued)

(56) References Cited

U.S. PATENT DOCUMENTS 3,090,695 A    5/1963   Orth, Jr.
3,125,461 A    3/1964   Hoffmann
(Continued)

OTHER PUBLICATIONS

Application and File History for U.S. Appl. No. 13/795,782, filed Mar. 12, 2013, inventor Craig A. Martin et al.
(Continued)

*Primary Examiner* — Joanna Pleszczynska
(74) *Attorney, Agent, or Firm* — Patterson Thuente Pedersen, P.A.

(57) ABSTRACT

The invention includes a method for preparing and top coating an item made of powder coated MDF (or other substrate containing wood) with the end result of improved visual and tactile smoothness; the invention includes the steps of cutting and machining the part, pre-powder preparation and sanding of the part, powder coating the part, post-powder preparation and sanding, and applying the liquid top coat to the part, resulting in a smoother finish than is currently available in any other powder coated MDF finish while requiring less coats than similar liquid paint finishes.

12 Claims, 15 Drawing Sheets

Related U.S. Application Data division of application No. 13/795,600, filed on Mar. 12, 2013, now Pat. No. 9,358,580.

(51) Int. Cl.

| | | |
|---|---|---|
| *B32B 21/08* | (2006.01) | |
| *B32B 21/12* | (2006.01) | |
| *B05D 7/00* | (2006.01) | |
| *B05D 7/06* | (2006.01) | |
| *B24B 7/28* | (2006.01) | |
| *B05D 3/12* | (2006.01) | |
| *B05D 3/06* | (2006.01) | |
| *B05D 5/00* | (2006.01) | |
| *B05D 7/08* | (2006.01) | |
| *C09D 163/00* | (2006.01) | |
| *B05D 3/02* | (2006.01) | |
| *B05D 1/04* | (2006.01) | |
| *B05D 3/04* | (2006.01) | |

(52) U.S. Cl.
CPC ............... *B05D 7/06* (2013.01); *B05D 7/08* (2013.01); *B05D 7/53* (2013.01); *B05D 7/54* (2013.01); *B05D 7/58* (2013.01); *B24B 7/28* (2013.01); *C09D 163/00* (2013.01); *B05D 1/045* (2013.01); *B05D 3/0218* (2013.01); *B05D 3/046* (2013.01); *B05D 2451/00* (2013.01)

(58) Field of Classification Search
CPC .... Y10T 428/24074; B05D 7/06; B05D 7/08; B05D 1/045; B05D 3/046
See application file for complete search history.

(56) References Cited

U.S. PATENT DOCUMENTS

| | | | |
|---|---|---|---|
| 3,480,456 A | 11/1969 | Forkner | |
| 4,541,466 A | 9/1985 | Stegherr | |
| H244 H | 4/1987 | Goodwin | |
| 5,708,039 A | 1/1998 | Daly et al. | |
| 5,714,206 A | 2/1998 | Daly et al. | |
| 5,743,789 A | 4/1998 | Russell | |
| 6,086,461 A | 7/2000 | Williams et al. | |
| 6,146,252 A | 11/2000 | Mårtensson | |
| 6,268,022 B1 | 7/2001 | Schlegel et al. | |
| 6,548,109 B1 | 4/2003 | Hagquist | |
| 6,797,322 B2 | 9/2004 | Tullos | |
| 6,859,988 B2 | 3/2005 | Lovchik et al. | |
| 6,887,516 B2 | 5/2005 | Krysa et al. | |
| 7,205,027 B2 | 4/2007 | Brosemer | |
| 7,275,979 B2 | 10/2007 | Raynauld | |
| 7,290,759 B1 | 11/2007 | Lavrencik | |
| 7,592,398 B1* | 9/2009 | Rye | C08G 18/4202 525/440.01 |
| 7,649,034 B2 | 1/2010 | Laddatto et al. | |
| 7,971,551 B2 | 7/2011 | Mauchle et al. | |
| 8,088,452 B2 | 1/2012 | Hwang et al. | |
| 8,088,855 B2 | 1/2012 | Hwang et al. | |
| 8,329,258 B2 | 12/2012 | Seitz | |
| 8,372,478 B1 | 2/2013 | Harris et al. | |
| 8,591,617 B2 | 11/2013 | Landgraf | |
| 8,597,735 B2 | 12/2013 | Inoue et al. | |
| 8,721,396 B1 | 5/2014 | Martin et al. | |
| 2001/0039110 A1 | 11/2001 | Nakamura | |
| 2003/0054740 A1 | 3/2003 | Mansky | |
| 2003/0148026 A1 | 8/2003 | Mushett et al. | |
| 2003/0194554 A1 | 10/2003 | Petersen et al. | |
| 2004/0235391 A1 | 11/2004 | Grivna | |
| 2005/0034785 A1 | 2/2005 | Lovchik et al. | |
| 2005/0153070 A1 | 7/2005 | Decker | |
| 2007/0099551 A1 | 5/2007 | Walsh | |
| 2007/0157994 A1 | 7/2007 | Scoville et al. | |
| 2007/0287000 A1* | 12/2007 | Thomas | C08J 9/365 428/304.4 |
| 2008/0233300 A1 | 9/2008 | Cinoman et al. | |
| 2008/0241478 A1 | 10/2008 | Costin | |
| 2009/0047480 A1 | 2/2009 | Juers et al. | |
| 2009/0071941 A1 | 3/2009 | Knoblauch et al. | |
| 2009/0192247 A1 | 7/2009 | Daly et al. | |
| 2011/0014441 A1 | 1/2011 | Braun | |
| 2011/0039110 A1 | 2/2011 | Azuelos | |
| 2011/0293843 A1 | 12/2011 | Wu | |

OTHER PUBLICATIONS

Application and File History for U.S. Appl. No. 13/795,600, filed Mar. 12, 2013, inventor Craig A. Martin et al.

Application and File History for U.S. Appl. No. 15/170,520, filed Jun. 2, 2016, inventor Craig A. Martin et al.

* cited by examiner

Pre-Powder Coating Sanding Steps for Part Faces and Edges, Preferred Embodiment

Step 1   220 grit aluminum oxide, silicon carbide, 3M Trizact, or the equivalent
Step 2   280 grit aluminum oxide, silicon carbide, 3M Trizact, or the equivalent
Step 3   320 grit aluminum oxide, silicon carbide, 3M Trizact, or the equivalent

FIGURE 12

Post-Powder Coating Sanding Steps for Part Edges Using Profile Sander, Preferred Embodiment

Step 1   320 grit aluminum oxide anti-static open coat, profile sander
Step 2   400 grit aluminum oxide or silicon carbide anti-static open coat, profile sander
Step 3   30μ grit aluminum oxide or silicon carbide anti-static open coat, profile sander

Post-Powder Coating Sanding Steps for Part Face, Preferred Embodiment

Step 1   P320 grit aluminum oxide anti-static open coat, wide belt veneer segmented platen sander, CBF Technology
Step 2   P500 grit aluminum oxide anti-static open coat, wide belt veneer segmented platen sander, CBF Technology
Step 3   30μ grit aluminum oxide anti-static open coat or silicon carbide anti-static open coat, wide belt veneer segmented platen sander, CBF Technology
Step 4   P180 or P220 grit aluminum oxide anti-static open coat, wide orbital machine sander
Step 5   P220 or P320 grit aluminum oxide anti-static open coat, wide orbital machine sander
Step 6   60μ or 50μ grit aluminum oxide anti-static open coat or silicon carbide anti-static open coat, wide orbital machine sander

*For light colors, the preferred embodiment for the wide orbital machine sander is in a P220/P320/60μ sequence run in tandem
*For dark colors, the preferred embodiment for the wide orbital machine sander is in a P320/P60/50μ run in tandem

FIGURE 13

| Rank | Top Coat | Properties |
|---|---|---|
| 1 | Pre-catalyzed lacquer | Good for 10°-90° gloss levels; repeatable and reliable |
| 2 | Post-catalyzed conversion varnish | Currently tested reliably for 15°-60° gloss levels, assumed that all other levels will work after development |
| 3 | Acrylic Catalyzed clear finish | Smoothness achieved, but clarity of finish can risk showing surface contamination (airborne particles) |
| 4 | 2K Polyurethane finish | |
| 5 | UV water based finish | Cures well but can yellow the color of the part. Further testing required. |
| 6 | UV solvent based finish | Cures well but can yellow the color of the part. Further testing required. |

FIGURE 14

Wide Belt Veneer Segmented Platen Sander, Cross Belt Finish (CBF) Technology

Step 1  P320 grit aluminum oxide anti-static open coat, CBF
Step 2  P500 grit aluminum oxide anti-static open coat wide belt
Step 3  30µ grit aluminum oxide anti-static open coat or silicon carbide anti-static open coat wide belt

Wide Orbital Machine Sander

Step 1  P180 or P220 grit aluminum oxide anti-static open coat
Step 2  P220 or P320 grit aluminum oxide anti-static open coat
Step 3  60µ grit silicon carbide anti-static open coat

FIGURE 15

TOP COATED AND POWDER COATED ARTICLE

CROSS-REFERENCE TO RELATED APPLICATIONS

This application is a continuation of application Ser. No. 15/170,520, filed Jun. 1, 2016, entitled "Method for Preparing and Top Coating a Powder Coated Wood Substrate," which is a division of application Ser. No. 13/795,600 filed Mar. 12, 2014, entitled "Method for Preparing and Top Coating a Powder Coated Wood Substrate", now U.S. Pat. No. 9,358,580, issued Jun. 7, 2016, which is hereby fully incorporated herein by reference.

TECHNICAL FIELD

The invention relates to a method of powder coating materials. More specifically, the invention relates to a process of taking a part made of powder coated MDF (or other substrate containing wood) and preparing it to accept a top coat of liquid finish, with the end goal of enhancing the final smoothness of finish.

BACKGROUND

Powder coating is a type of coating that is applied as a free-flowing, dry powder. The main difference between a conventional liquid paint and a powder coating is that the powder coating is stored as a solid and does not need to be kept in a liquid form (using such liquids as a water base or solvent) in order to keep the binder and filler particles in suspension. The coating is typically applied electrostatically and is then cured under heat to allow it to flow and form a "skin" around all or part of the substrate. The powder may be a thermoplastic, thermoset, or UV polymer. It is usually used to create a hard finish that is tougher than conventional paint. Powder coating is mainly used for coating of metals, such as household appliances, aluminum extrusions, and automobile and bicycle parts. Newer technologies allow other materials, such as MDF (medium-density fiberboard), to be powder coated using different methods.

There are several advantages of powder coating over conventional liquid coatings:
1. Powder coatings emit zero or near zero volatile organic compounds (VOC).
2. Powder coatings can produce much thicker coatings in one coat than conventional liquid coatings without running or sagging.
3. Powder coating overspray can be recycled and thus it is possible to achieve nearly 100% use of the coating.
4. Powder coating production lines typically produce less hazardous waste than conventional liquid coatings.
5. A wide range of specialty effects is easily accomplished which would be impossible to achieve with other coating processes.

While powder coatings have many advantages over other coating processes, there are some disadvantages to the technology. Although the powder is relatively easy to apply in a single thick coating, a single powder coat is not as smooth as a similarly thick liquid paint finish; however, to achieve a similarly thick liquid paint finish it is necessary to apply multiple coats with sanding between each coat. Furthermore, the application of multiple powder coats serves to further increase the thickness of the coating, but does not reliably enhance the visual or tactile smoothness of the powder coated finish.

Many manufacturers of powder coated MDF have taken various steps in the past in order to improve the smoothness of the finish. Methods include:
1. Varying the preheat and cure temperature settings
2. Additional pre-coating sanding, both manual and automated
3. Installation of infrared heaters or UV curing lights at various points in the powder coating line
4. Reformulation of powder used in the coating process
5. Polyester versus epoxy base of the powder coating (chemistry adjustments)
6. Increased fineness of powder grind
7. Repeated sifting of powder during formulation
8. Automated versus hand spraying and measurement of application The aforementioned methods have indeed resulted in incrementally increased smoothness relative to previously existing methods. Employing any or all of these methods, however, results in a maximum surface smoothness in the 4-6 range on the PCI scale.

In such industries as furniture and cabinetry, there is growing demand for increasingly smooth finishes. Traditionally, this demand has been met through such finishes as laminates, veneers, vinyl wraps, or liquid paints. These traditional finishes have their own shortcomings and powder coated MDF is frequently a more desirable choice for durability or part design needs. However, it is not possible to achieve similar smoothness in powder coated MDF finishes regardless of content or steps.

Therefore, there exists a need for a method of preparing and top coating an item made of powder coated MDF that enhances visual and tactile smoothness.

SUMMARY

The invention relates to a method for preparing and top coating an item made of powder coated MDF in order to enhance visual and tactile smoothness. In one embodiment, the invention includes the steps of cutting and machining the part, pre-powder preparation and sanding of the part, powder coating the part, post-powder preparation and sanding, and applying the liquid top coat to the part.

In another embodiment, the method includes the steps of obtaining a part that is fabricated from a substrate containing wood, cutting and machining the part to a desired size utilizing equipment that has a tolerance that is less than +/−0.030". Next, the part undergoes pre-powder preparation and sanding by utilizing a sander to smooth the faces and edges of the part, whereby the sander has a Y-axis tolerance of less than 0.003", and wherein the edges are sanded to a minimum radius of ⅟₃₂" (0.8 mm). Next, the part is powder coated whereby the part is coated with at least 5 mils of coverage about its surfaces and edges. The part then undergoes post-powder preparation and sanding using an abrasive, whereby the edges and faces of the part are sanded to a PCI smoothness of at least 7. Lastly, a liquid top coat is applied to the part to achieve a minimum top coat thickness of 2 wet mils.

In an alternative embodiment, the invention includes a method for powder coating a part to enhance visual and tactile smoothness. The method includes the steps of obtaining a part that is fabricated from medium-density fiberboard, cutting and machining the part to a desired size utilizing equipment that has a tolerance that is less than +/−0.030", pre-powder preparation and sanding of the part by utilizing a sander to smooth the faces and edges of the part, whereby the sander has a Y-axis tolerance of less than 0.003", and wherein the edges are sanded to a minimum radius of 1/32" (0.8 mm), and wherein the part is first sanded with a 220 grit aluminum oxide, silicon carbide media, then sanded with a 280 grit aluminum oxide, silicon carbide media, then sanded with a 320 grit aluminum oxide, silicon carbide media. The part is then powder coated, whereby the part is heated to a consistent temperature to create an electrostatic charge, wherein powder is applied to the part and the part is then allowed to cure, resulting in a part that is coated with at least 5 mils of coverage about its surfaces and edges. Next, the part undergoes post-powder preparation and sanding using an abrasive having a minimum grit size of 15μ, whereby the edges of the part are sanded and whereby the faces of the part are sanded to a PCI smoothness of at least 7. Lastly, a liquid top coat is applied to the part to achieve a minimum top coat thickness of 2 wet mils; whereby the finished part has a PCI smoothness of at least 7.

In yet another alternative embodiment, the invention includes an article having enhanced visual and tactile smoothness. The article comprises a substrate containing wood. A surface coating with PCI smoothness of at least 7 is formed on the surface of the article by the process of cutting and machining the part to a desired size utilizing equipment that has a tolerance that is less than +/−0.030, pre-powder preparation and sanding of the part by utilizing a sander to smooth the faces and edges of the part, whereby the sander has a Y-axis tolerance of less than 0.003", and wherein the edges are sanded to a minimum radius of 1/32" (0.8 mm). Next, the part is powder coated whereby the part is coated with at least 5 mils of coverage about its surfaces and edges. Next, the part undergoes post-powder preparation and sanding using an abrasive, whereby the edges and faces of the part are sanded to a PCI smoothness of at least 7. Next, a liquid top coat is applied to the part to achieve a minimum top coat thickness of 2 wet mils. Compared with untreated powder coated MDF, the resulting finish is significantly smoother than other known powder coated finishes.

The idea of a top coat over powder coated MDF in order to enhance surface smoothness is novel and is not known to have been employed before the conception of this invention; further, it results in a smoothness rating in the range of 8-10 on the PCI scale, a smoothness that is not currently attainable with existing powder coated MDF finishes.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 12 illustrates the ideal abrasive grit sequences for pre-powder coating sanding in the preferred embodiment of the invention;

FIG. 13 illustrates the ideal abrasive grit sequences for post-powder coating sanding in the preferred embodiment of the invention;

FIG. 14 illustrates a rank order of the various liquid top coats that have been tested in accordance with the present invention; and FIG. 15 illustrates the sanding grit sequences used in the example and comparative examples.

Figure 1:
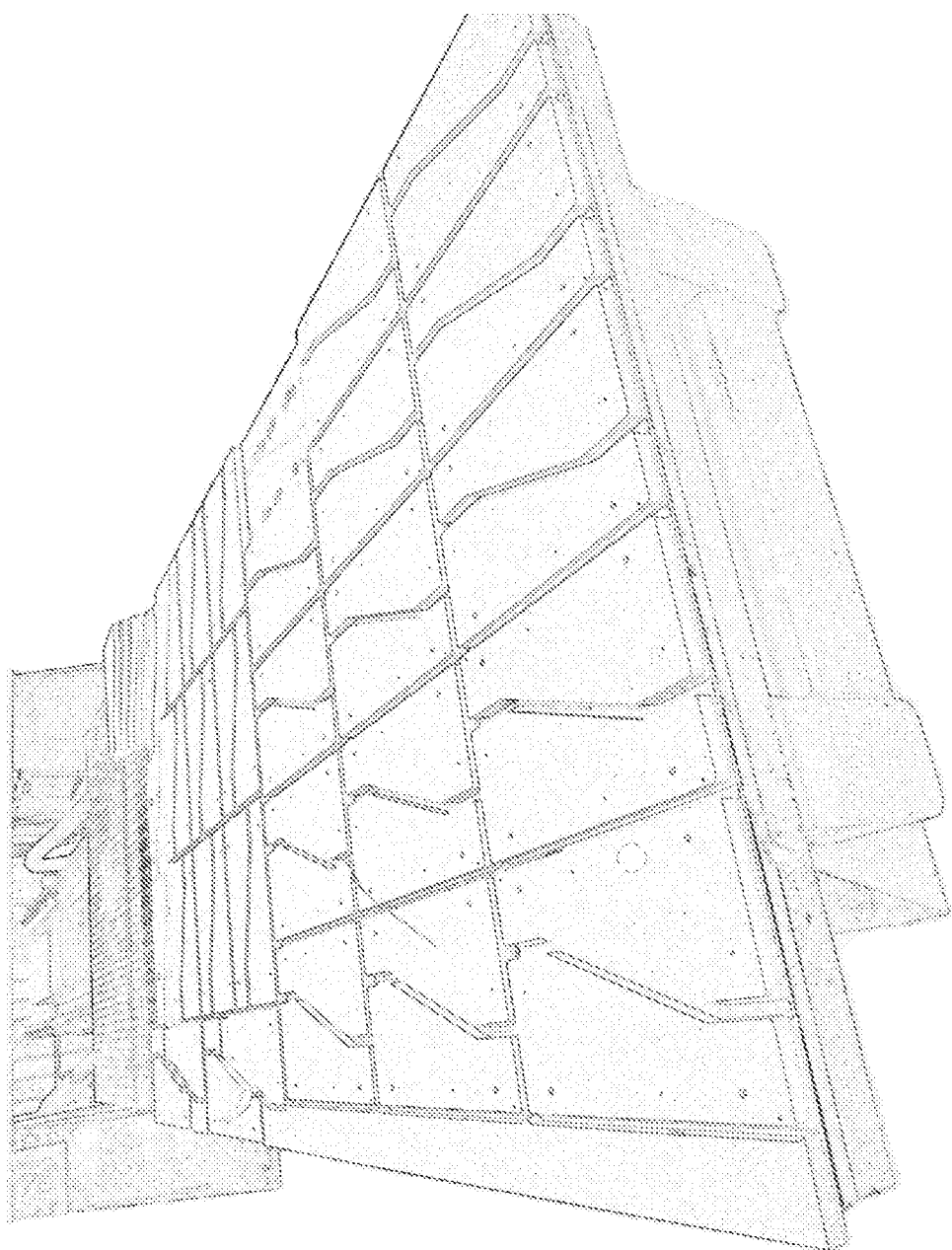
FIG. 1 illustrates MDF parts that have been cut on a CNC router machine.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention relates to a method for preparing and top coating an item made of powder coated MDF in order to enhance visual and tactile smoothness. Compared with untreated powder coated MDF, the resulting finish is significantly smoother than existing known methods:

1. Untreated powder coated MDF is able to achieve a PCI smoothness of 4-6.
2. Top coated over untreated powder coated MDF is able to achieve a PCI smoothness of 4-6.
3. Buffed untreated powder coated MDF is able to achieve a PCI smoothness of 4-6.
4. Top coated over treated powder coated MDF, in accordance with the present invention, is able to achieve a PCI smoothness of 8-10, by using a liquid top coat to seal the treated surface finish.

For the purposes of this application, "smoothness" refers to the visual detectability of smoothness or lack of a rough texture, known as "orange peel" in a finished surface. ACT Test Panels Inc. manufacturers the PCI smoothness scale for powder coated finishes. This scale is commonly employed by a wide variety of industries to compare visual smoothness of painted finishes. The scale ranges from 1-10, with 1 being a heavy texture and 10 being completely smooth (glass-like). For the purposes of this application, "failure" is meant to describe a situation resulting in a less-than-ideal finish. Failures can include situations such as sanding through the coating to the bare substrate, or a final smoothness that is less than PCI 8-10; PCI 8-10 is a smoothness range which is higher than is currently attainable with any other existing untreated powder coated MDF finish. For the purposes of this application, "untreated" refers to a standard powder coated MDF part that has not been modified in any way after the standard coating has been applied. "Treated" refers to powder coated MDF parts that have received the additional steps outlined in this application.

Figure 10:
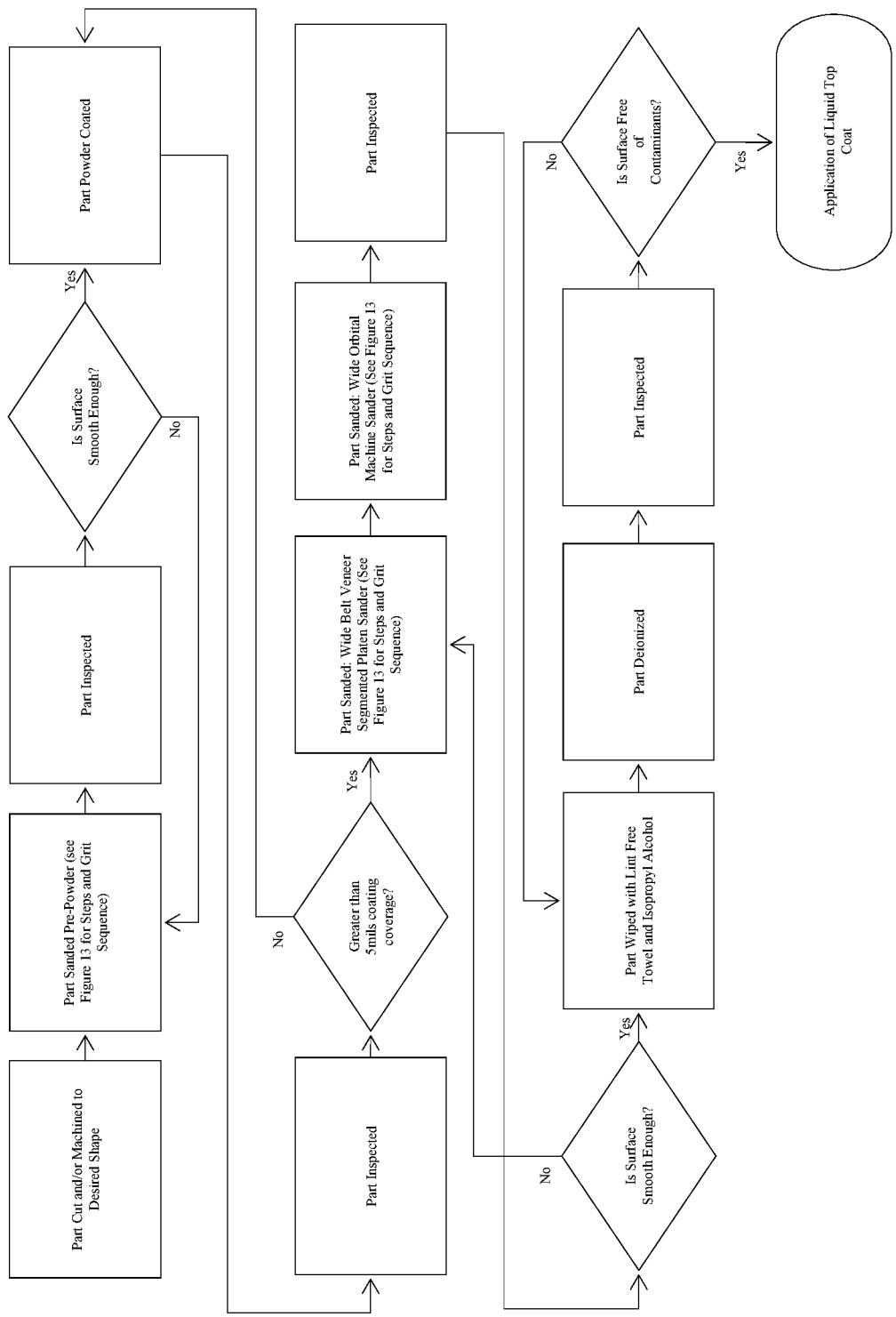
FIG. 10 illustrates the process steps and decision points in accordance with the present invention.

The overall process and decision points involved in the present invention is shown in FIG. 10. However, there are five basic steps in the process of the present invention. First, the part is machined and cut to the desired size. Second, the part receives a pre-powder preparation and sanding. Third, the part undergoes a powder coating process. Fourth, the part undergoes post-powder preparation and sanding. Lastly, a liquid top coat is applied to the part. With respect to the process of the present invention, the preferred substrate is MDF; however, similar results can be achieved with the process described on other substrates with wood content (such as high density fiberboard). Therefore, other substrates containing wood could be used while remaining within the scope of the invention.

The first step of cutting and machining the part will now be discussed. In this step, MDF components are machined (cut to drawn shapes and designs) from purchased sheet stock in powder coat grade, available from a variety of milling operations. Parts cut from MDF on a CNC machine are shown in FIG. 1. MDF sheet brands and thicknesses are variable and are not critical to this process. Machining operations generally utilize such equipment as CNC routers, CNC point-to-point drilling/milling equipment, through feed molding machines, shapers, hand routers, panel saws, sliding table saws, and fixed table saws. The parts to be coated can be any shape designed from flat sheet material, provided the design fits within tolerances and parameters outlined herein.

Success of the sanding, preparation, coating, and post-coating processes is dependent on the initial quality of the machining. "Quality of Machining" is defined as:

In a preferred embodiment, the tolerance of the equipment cutting the profile is less than +/−0.030"
Any cuts outside of tolerance will result in a part that is larger or smaller than expected in certain places. This means that, during the post-powder sanding process, there is a risk of sanding through the powder coat to the raw wood substrate. This would result in a failure of the part, as the part would be rendered useless.

In a preferred embodiment, tooling for this process is in new condition
Tooling is the equipment that actually makes the cuts in the wood. It is optimal that the tooling is in new condition so that it is as sharp and accurate as possible. Otherwise, inconsistent cuts will result and uneven sanding or top coat application will be the outcome.

In a preferred embodiment, the tooling is constructed of solid carbide or high speed steel
Solid carbide and high speed steel tooling is sharper than standard diamond tooling, resulting in a smoother and more reliable cut. Smoother, more reliable cuts result in a more even surface and decrease the chance or part failure during post-powder sanding.
Standard diamond tooling is less preferred because it is generally not sharp enough to reliably achieve similar smoothness of cut required for successful finishing without imperfections from fiber pop. Fiber pop is a failure wherein the fibers of the boards "pop up" during heating, resulting in an uneven surface and increasing the chance of part failure during post-powder sanding. Although standard diamond tooling could theoretically be used, it increases the likelihood of part failure.

Figure 2:
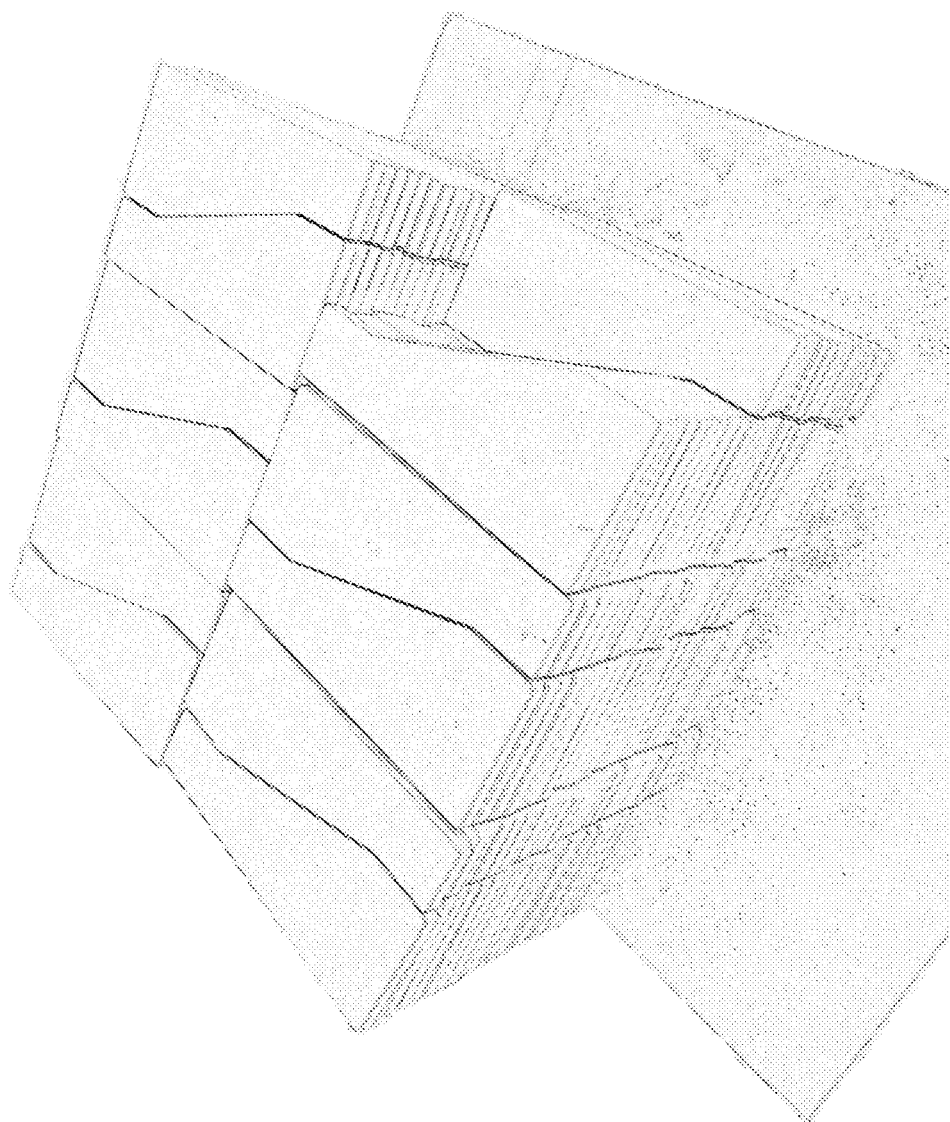
FIG. 2 illustrates MDF parts that have received the pre-powder coating preparation and sanding steps according to the invention.

The second step of pre-powder coating preparation and sanding of the part will now be discussed. The face and edge preparation treatments are important to the final quality and appearance of the finished parts, and should be considered as part of this invention; this step is material to the invention because omission of the step can leave surface irregularities and contamination on the surface of the board to be coated. These irregularities are subsequently covered by the powder coating but can then be exposed when sanding after powder coating. The result is an increased probability of sanding through to the surface contamination, demonstrating visible speckling or color irregularity and resulting in a part failure. Parts that have been appropriately sanded as described are illustrated in FIG. 2.

In this pre-powder coating preparation and sanding step, the part faces are sanded using a wide belt sander, a wide belt veneer segmented platen sander, a wide orbital machine sander, a random orbital hand sander, or a combination of this sanding (or other surface smoothing) equipment. Grit types and sizes can vary based upon the abrasive manufacturer and the equipment being utilized. The edges are prepared in a similar manner with like grit materials using machine edge sanding equipment utilizing belts, disks, profiled sanding heads or other sanding techniques specific to the machine manufacturer and dictated by suitability with shape of part being sanded. The specific abrasive material, manufacturer, and equipment is not critical and can be varied while remaining within the scope of the invention.

The following steps should ideally be taken to ensure proper pre-powder coating part preparation:

In a preferred embodiment, abrasive grit sequence is applied in accordance with the grit sequence table in FIG. 12.

In a preferred embodiment, automated edge sanding machines should have a Y-axis tolerance of less than 0.003" to avoid sanding through the powder coated base finish.

In a preferred embodiment, manual (hand) sanding equipment should be held flat (parallel) to the surface being sanded in order to avoid sanding through the powder coated base finish.

In a preferred embodiment, edges generally should not be designed with deeply machined profiles, as it is generally necessary for sanding equipment to reach all parts of the face and edges to achieve uniform quality of finish. Deeply machined profiles are difficult to reach with sanding equipment, increasing the probability that an area of the part is left without being sanded. Regions of the part that are not sanded can result in a finish that is less than optimal and that has a higher potential part failure rate. Specific depth parameters depend upon the sanding equipment being applied, but it is necessary for the entire part to be sanded, otherwise the top coat adhesion will fail.

In a preferred embodiment, edges of the components should preferably have a minimum radius of 1/32" (~0.8 mm) to avoid "burning through" the edges with sanding equipment.

Figure 11:
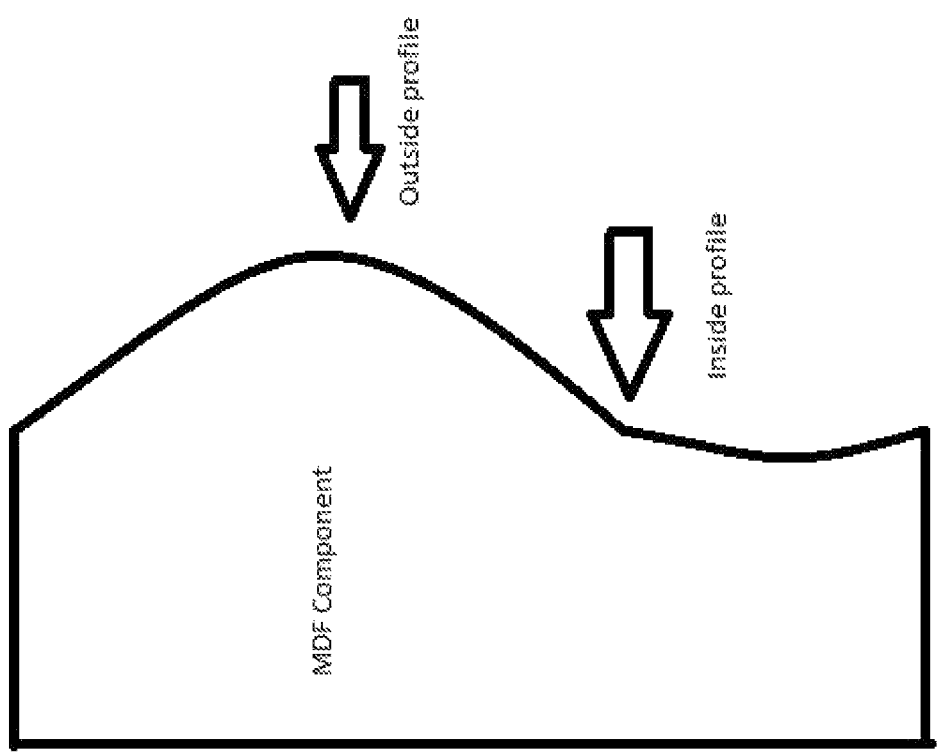
FIG. 11 illustrates examples of inside and outside radii on a powder coated MDF part.

In a preferred embodiment, inside profiles (also known as radii) should be designed to accommodate for edge machine sanding capabilities. FIG. 11 depicts examples of inside and outside radii. These specific radii criteria are dependent on the type of edge sanding equipment milling stations available or chosen at machine purchase.

This parameter is important because the part should be properly sanded in all areas to receive the final liquid top coat.

The step of powder coating the MDF substrate will now be discussed. There are a variety of known methods to powder coat components machined from MDF. The overall process described herein can be applied to known powder coated MDF finishes in general, regardless of basic powder coating method used. A powder coated MDF finish can be obtained by heating the substrate to a consistent temperature in order to create an electrostatic charge, applying the powder, and allowing it to cure. Alternately, ultraviolet light can be used to coat the part via a UV-cured powder coating process while remaining within the scope of the invention. As previously described, the method of powder coating is not critical to the overall invention described herein. The preferred embodiment in these steps is that surfaces and edges should optimally have at least 7-8 mils of coating coverage; otherwise, post coating sanding may sand through the coating, exposing the raw wood substrate and resulting in a failure.

A main reason why powder coating is critical to the process of the present invention is that powder coating results in a thicker coating per coat on a wood substrate than liquid paints. Furthermore, the powder coated finish is harder than that of a liquid paint, so it can be sanded more consistently without "burning through" the coating. It is theoretically possible that 5-8 mils of paint thickness could be achieved using a liquid paint, but it would require multiple base coats-in many cases, at least 4-6 base coats. Comparatively, powder coatings with a thickness of 5-8 mils can routinely be achieved using a one-pass (one coat) powder coat process.

The step of post-powder preparation and sanding of the coated part will now be discussed. After the powder coat is applied, it is optimal to follow specific steps of the sanding process as described herein in order to achieve the desired finish. This is one of the most critical aspects of the entire process of the present invention.

Figure 7:
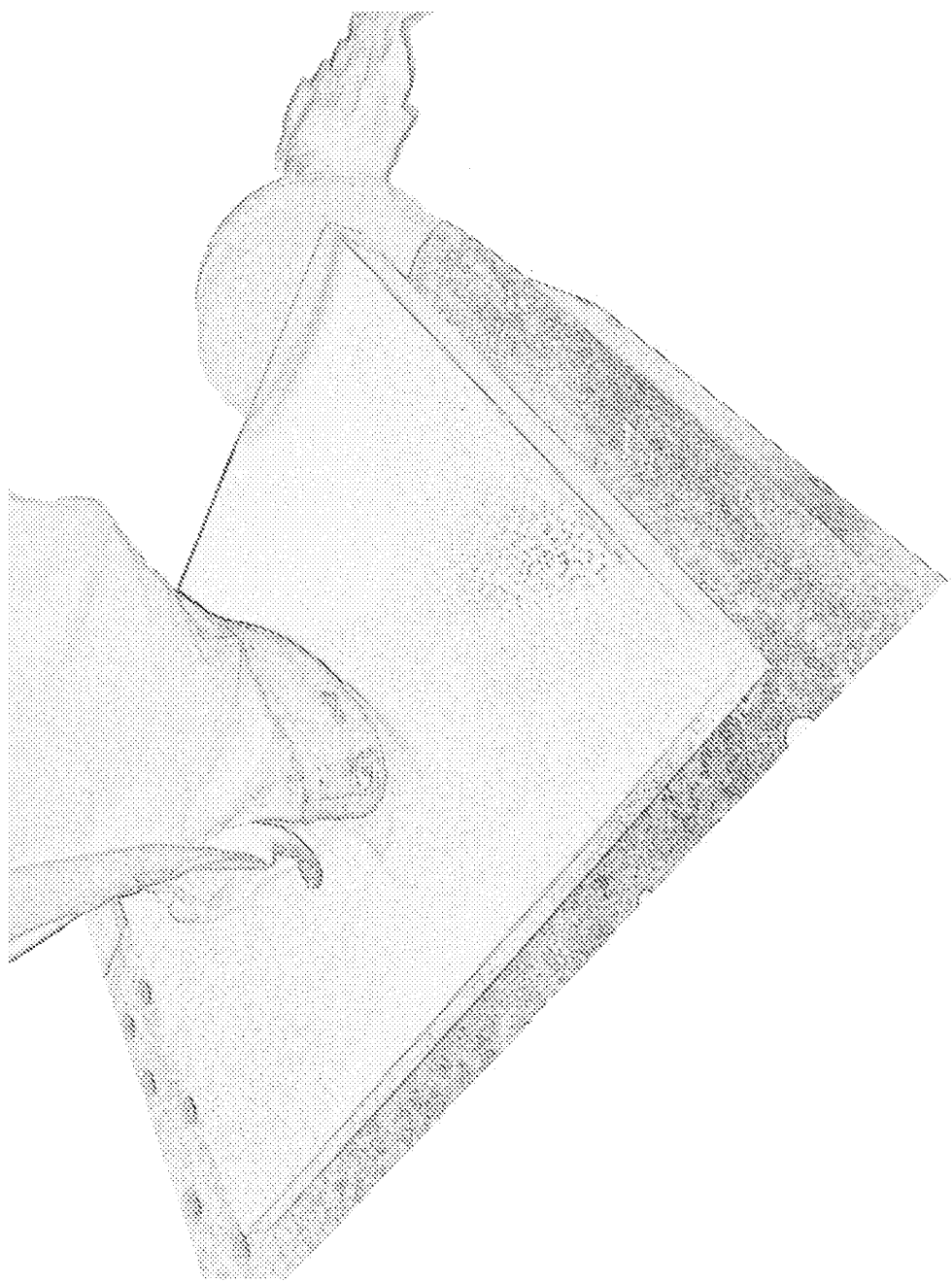
FIG. 7 illustrates a view of sanding the edge of the part with a random orbital hand sander in accordance with one embodiment of the invention.

In the preferred embodiment of this step, the edges of the part are sanded first, using an abrasive method as shown in FIG. 7. The edge sanding equipment and methodology used is variable and can vary based upon the shape of the edge profile by those skilled in the art. In a preferred embodiment, a profile sander is utilized in accordance with grit sequences set forth in FIG. 13 for the corresponding equipment. Successful testing has been conducted as well using a random orbital sander in accordance with the grit sequences set forth in FIG. 13 for the corresponding equipment.

Figure 3:
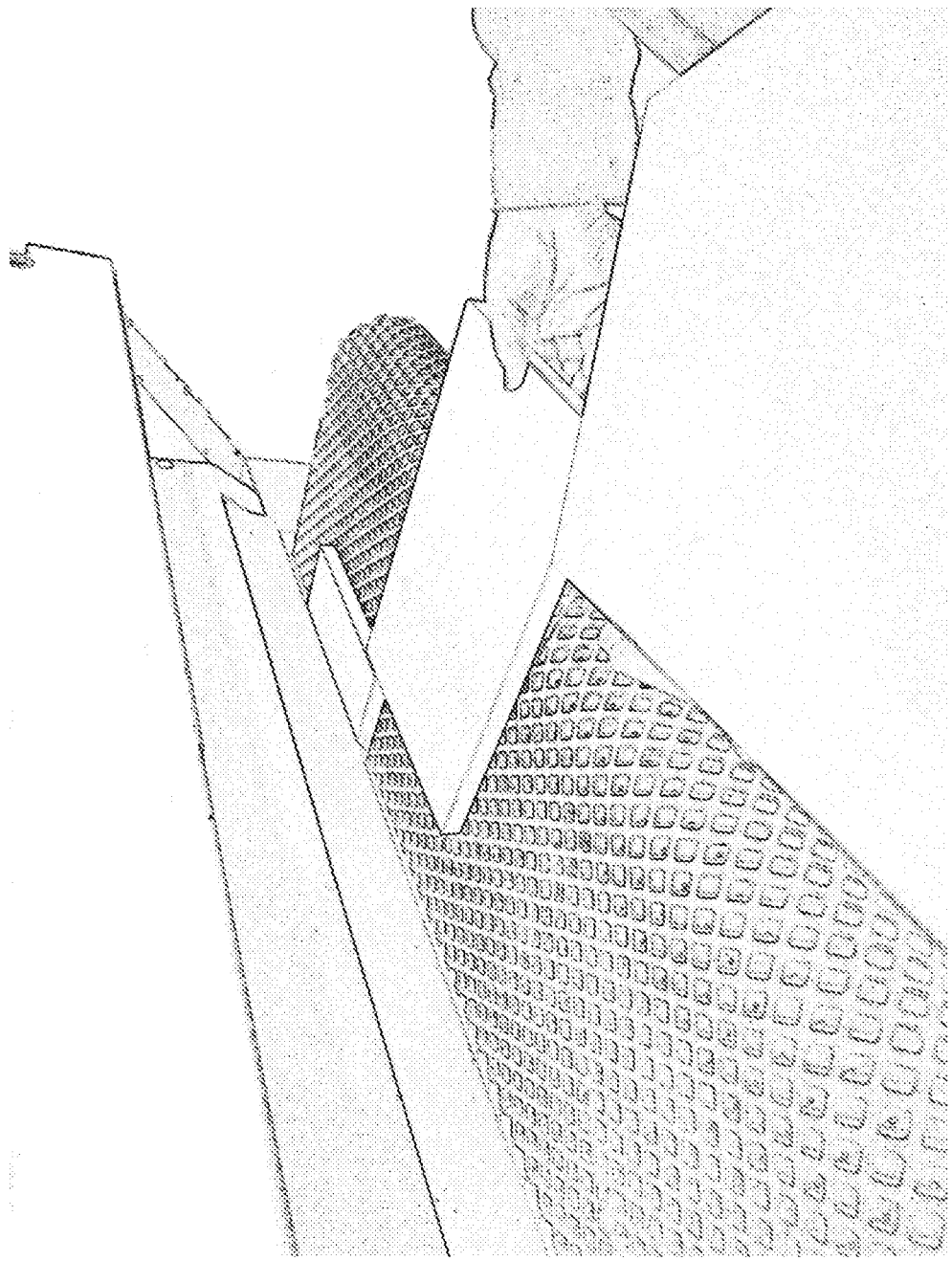
FIG. 3 illustrates the step of inserting the powder coated part into the wide belt veneer segmented platen sander according to the invention.
Figure 6:
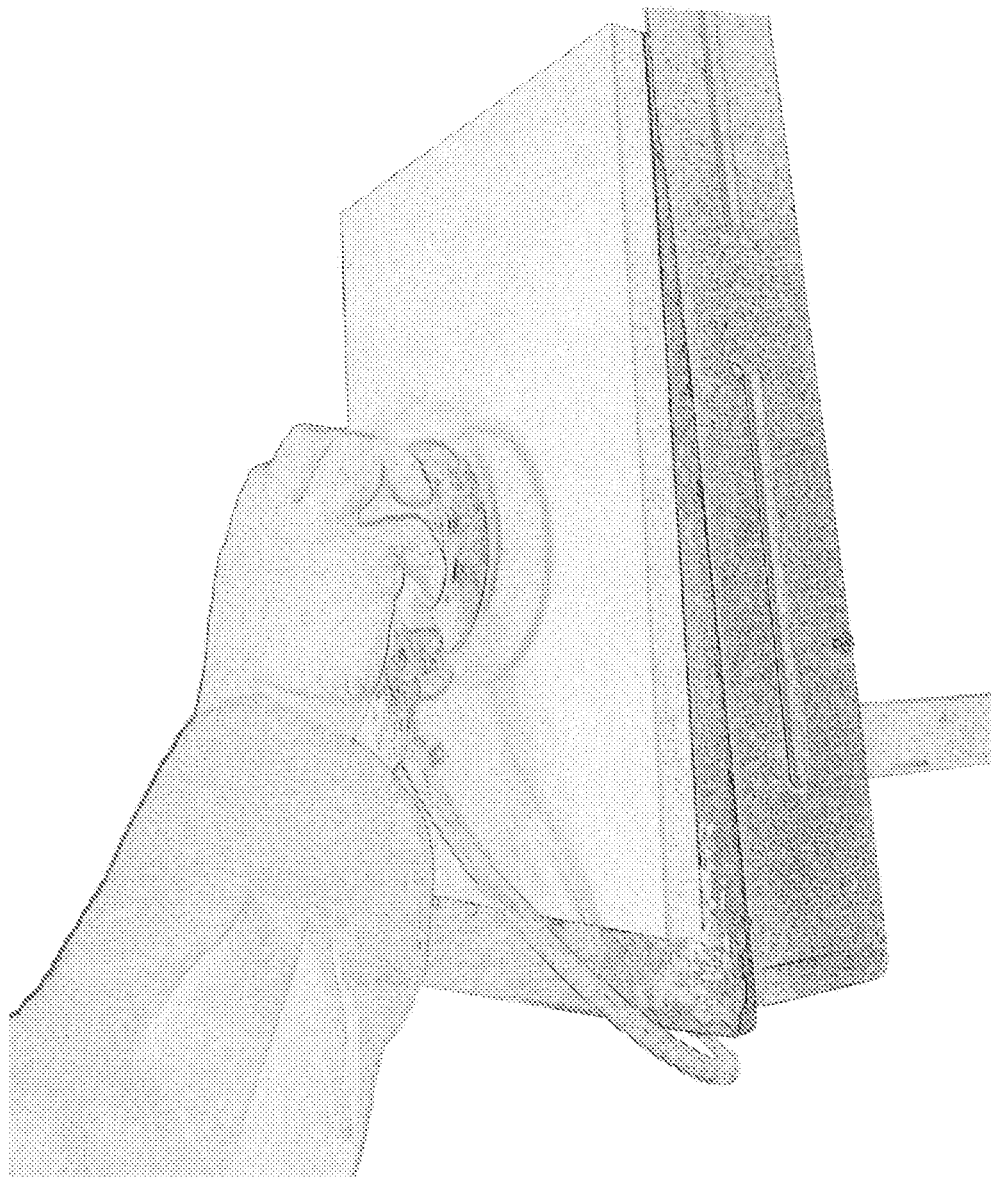
FIG. 6 illustrates the step of sanding the part with a random orbital hand sander in accordance with one embodiment of the invention.
Figure 8:
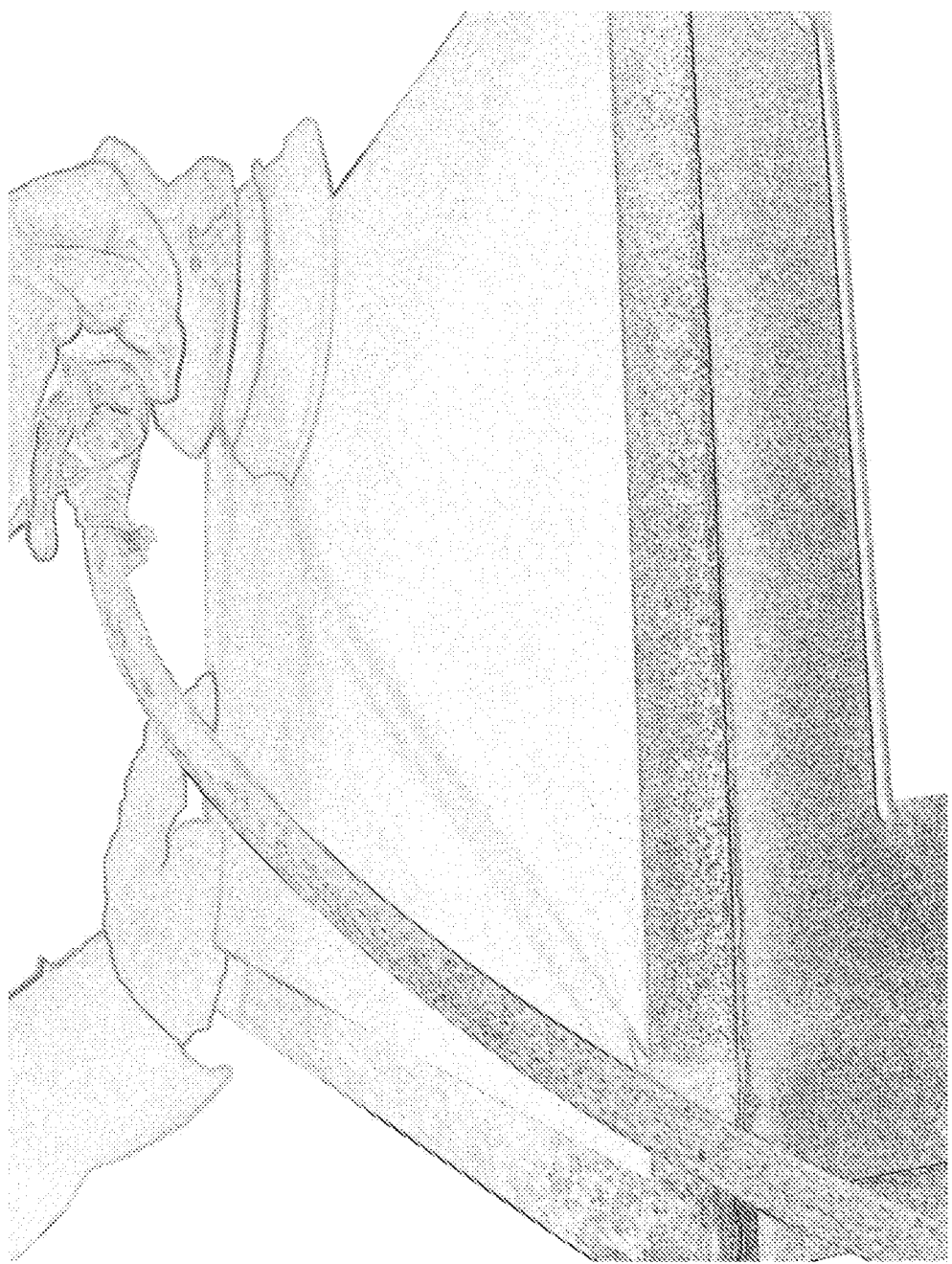
FIG. 8 illustrates a view of sanding the part with a random orbital hand sander wherein the sanding process is almost complete and the part is ready for application of the liquid top coat. There is no more visible orange peel.

Once the edges of the part has been sanded using the abrasive methods described herein, the face of the part is then ready to be sanded in accordance with abrasive methods demonstrated in FIGS. 3, 6, and 8. The most common machinery employed is one (or a combination) of the following: a wide belt sander, a wide belt veneer segmented platen sander, a wide orbital machine sander, a random orbital hand sander. In a preferred embodiment, the method employs the wide belt veneer segmented platen sander and wide orbital machine sander operated in tandem. Abrasive grit size and sequence is important to this process and varies based upon the abrasive manufacturer and the specific sanding equipment being used. In a preferred embodiment, abrasives with a minimum of 15µ grit size should be used in this step to accomplish proper adhesion of the liquid top coat during the final liquid top coat step. A diagram of preferred embodiment grit size and sequences for this step is set forth in FIG. 13, broken out by sanding equipment being used.

Figure 4:
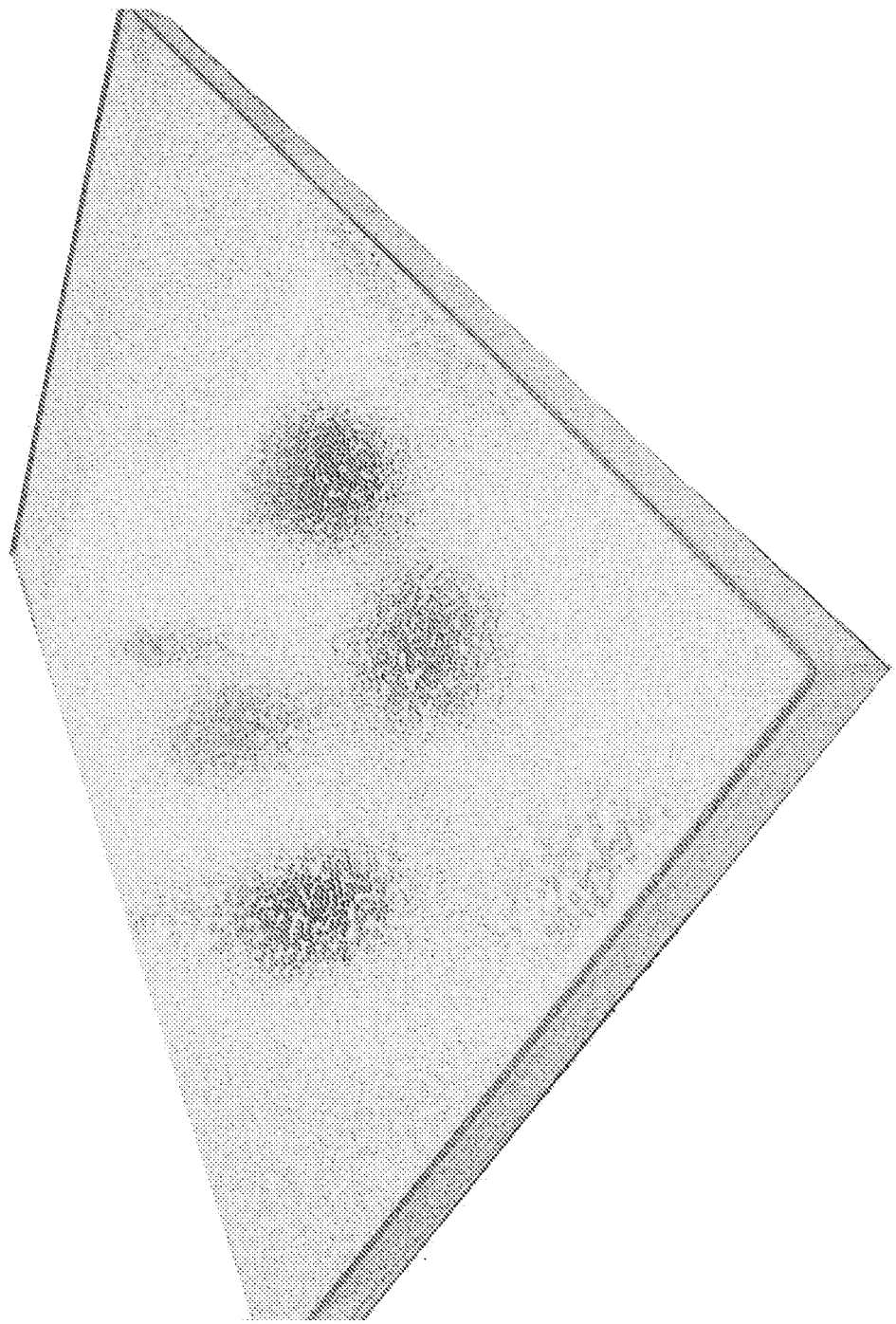
FIG. 4 illustrates orange peel, viewable at an angle, that has been partially sanded down after the wide belt, according to the invention.
Figure 5:
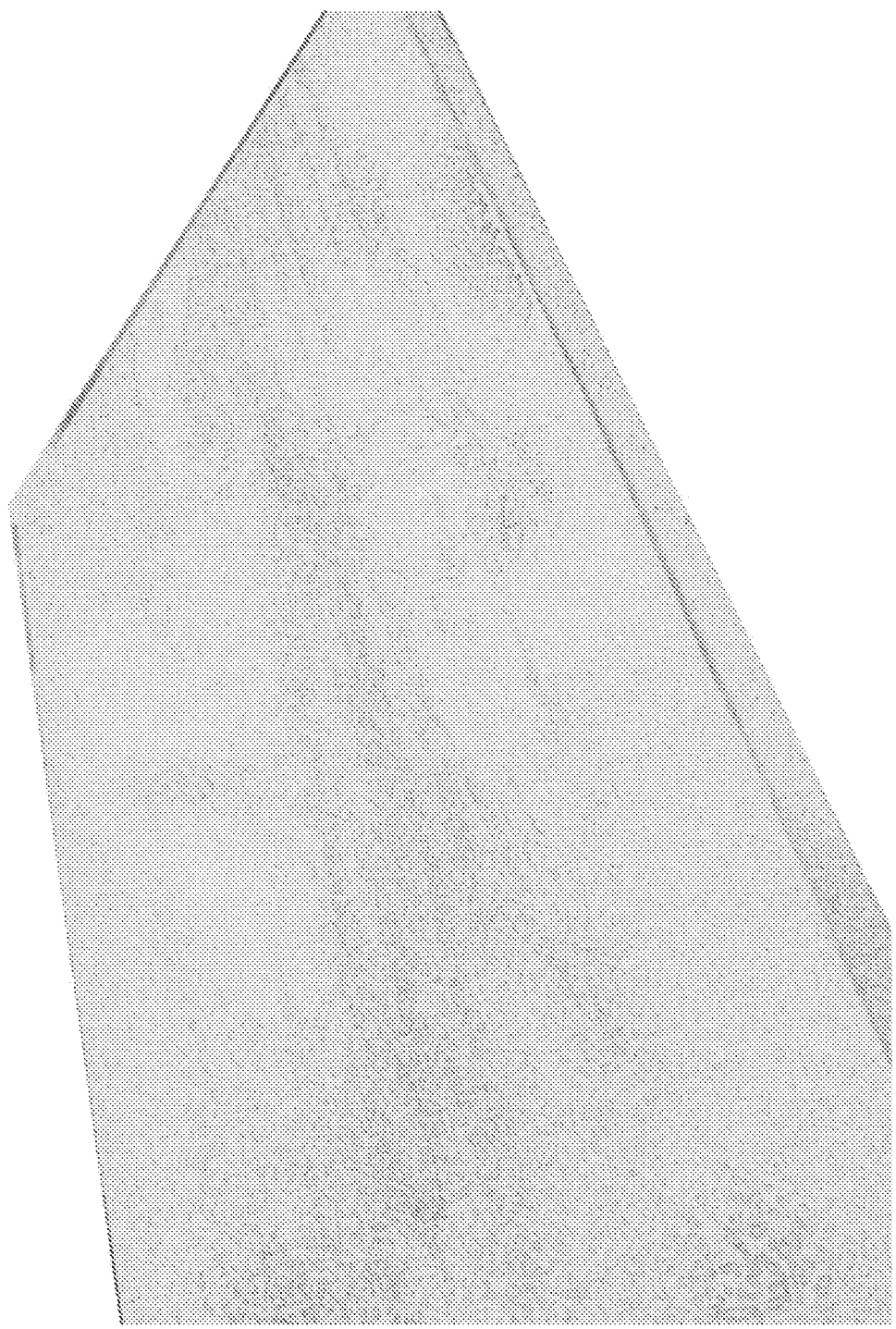
FIG. 5 illustrates another view of the sanded orange peel after the wide belt, according to the invention.

In a preferred embodiment, wide belt veneer segmented platen sanders with the Cross Belt Finish (CBF) technology are employed when sanding the face; this equipment is preferred because it results in the most reliable outcome with the least amount of fallout and required rework, as shown in FIGS. 4-5. This CBF technology is the preferred, but not the only, wide belt veneer segmented platen sander technology that will work for the present invention.

It is possible that a variety of other face and edge sanding (or other surface smoothing) equipment could be utilized while remaining within the scope of the invention, however the specific equipment listed herein has been tested for repeatable success. Further, it is possible to achieve a lesser quality finish (but still smoother than untreated powder coated MDF) using a variety of other equipment, grits, sequences, and process order changes (such as sanding the face before the edges). For example, a PCI smoothness of 7-8 is sporadically possible using different grits and sequences, whereas a PCI smoothness of 8-10 is routinely and reliably attainable using the method described herein.

Figure 9:
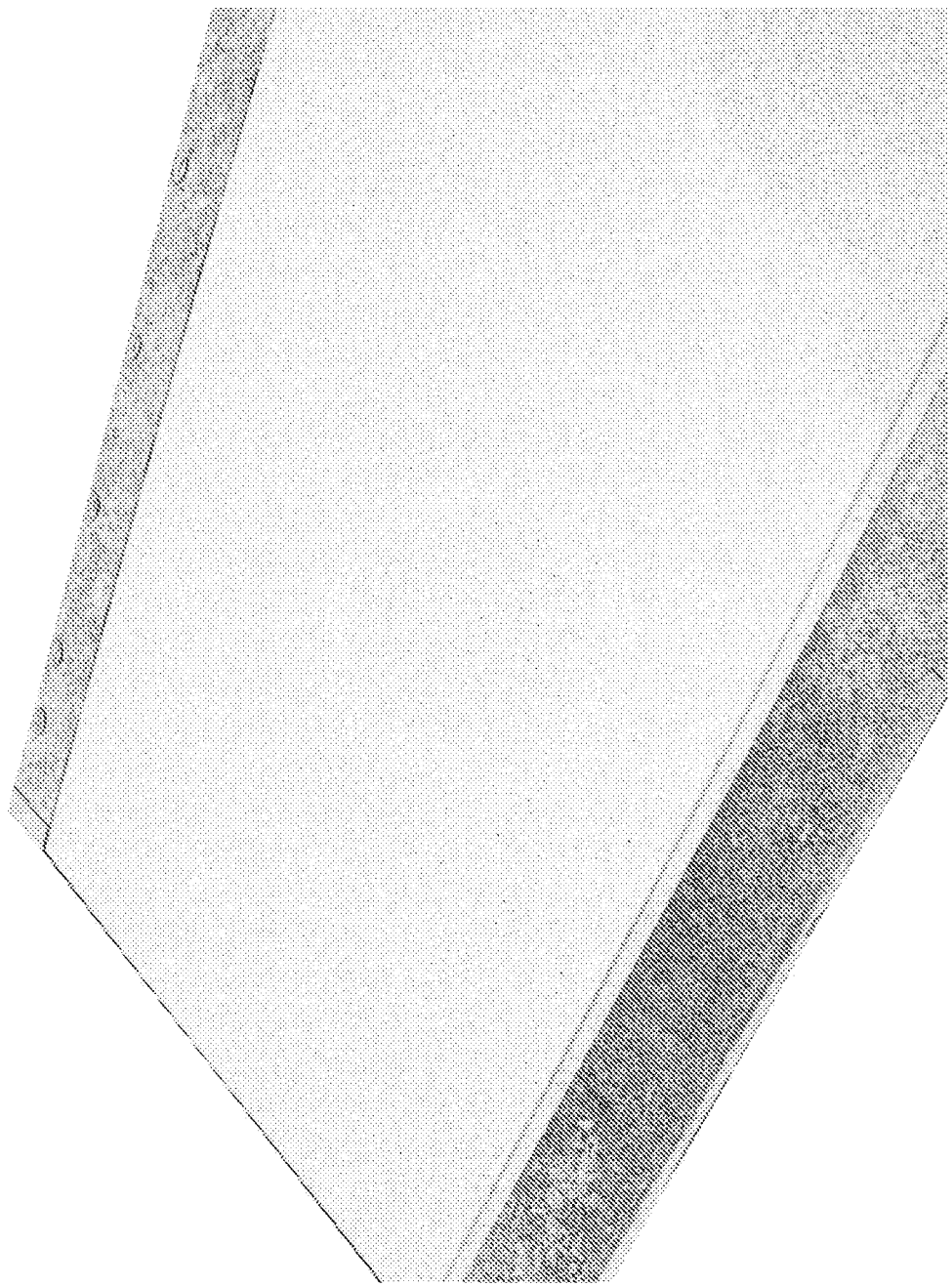
FIG. 9 illustrates a view of the part after sanding is complete and ready for liquid top coat.

Once the face and edges achieve the desired smoothness as shown in FIG. 9, the part is ready to accept a liquid top coat. The application of liquid top coat will now be discussed. The liquid top coat should be applied according to manufacturer directions and in a preferred embodiment should be applied to a minimum thickness of 2 wet mils; some variation in final thickness is created by the type of liquid finish used and the application process. An inferior finish can be obtained using top coat coverage of less than 2 wet mils. Automated processes typically receive 2 wet mils of coverage, and manual processes typically receive 3-5 wet mils of coverage. In a preferred embodiment, several specific steps should be taken as part of the liquid top coat step of this described process:

The entire part is wiped using a lint free towel and isopropyl alcohol.

The surface is deionized to avoid attraction of dust and other foreign particles. Otherwise the final top coat may be contaminated.

One coat is sufficient for automated or manual application processes, however two coats can be applied for a more robust or lustered finish. Light sanding is necessary if a second coat is applied.

See FIG. 14 for a diagram of several liquid top coats that have been tested for use in the invention. Although this is not a comprehensive list of all liquid top coats that will work with the invention, it is ranked in order of desirability of those currently tested for use with the process. In a preferred embodiment, pre-catalyzed lacquers or post-catalyzed conversion varnishes are used as the liquid top coat. Furthermore, although the examples described herein often refer to clear liquid top coats, it is not essential to the success of the invention that the liquid top coat explicitly be clear in color. For example, tinted liquid top coats or those containing color pigments can also work successfully with the invention.

A top coat applied to powder coated MDF, without the specific treatments outlined in this application, would result in a similar PCI smoothness number as the untreated part. Simply sanding the powder coated MDF part, without application of a top coat, will result in a "chalky", delicate finish that does not have the durability characteristics of either the untreated or final top coated part. Furthermore, a wide variety of abrasive grit numbers and sequences have been tested; those grit numbers and sequences not outlined in this application either result in lesser smoothness ratings or result in a coating failure. The only known method to improve PCI smoothness of a powder coated MDF finish is to follow the pre- and post-coating steps as well as the abrasive grit number and sequences outlined in this application.

EXAMPLE 1

A sheet of powder coat grade MDF is cut by a CNC router with new condition solid carbide tooling into a rectangle with dimensions of 12"W, 18"L, 0.75" thickness. Edge profiles are shaped to 1/16" radius and the part is sanded using an automated sanding machine. The part is powder coated to a thickness of 8 mils using a white epoxy thermoset powder. At this point, the powder coated part has a PCI smoothness of 5-6. After powder coating, the coated part is sanded with a veneer segmented platen sander and wide orbital machine sander operated in tandem. An abrasive grit sequence is followed with the corresponding piece of equipment as represented in FIG. 15.

After the above sanding sequences, a 5 mil 85 degree gloss pre-catalyzed clear lacquer top coat is manually applied to the part. The resulting part has a PCI smoothness of 10 and the visual depth of a 5-coat wet sanded liquid paint finish.

COMPARATIVE EXAMPLE 1a

A sheet of powder coat grade MDF is cut by a CNC router with new condition solid carbide tooling into a rectangle with dimensions of 12"W, 18"L, 0.75" thickness. Edge profiles are shaped to 1/16" radius and the part is sanded using an automated sanding machine. The part is powder coated to a thickness of 8 mils using a white epoxy thermoset powder. At this point, the powder coated part has a PCI smoothness of 5-6. Without first sanding the powder coated part, a 5 mil 85 degree gloss pre-catalyzed clear lacquer top coat is manually applied. The resulting part has an unchanged PCI smoothness of 5-6.

COMPARATIVE EXAMPLE 1b

A sheet of powder coat grade MDF is cut by a CNC router with new condition solid carbide tooling into a rectangle with dimensions of 12"W, 18"L, 0.75" thickness. Edge profiles are shaped to 1/16" radius and the part is sanded using an automated sanding machine. The part is powder coated to a thickness of 8 mils using a white epoxy thermoset powder. At this point, the powder coated part has a PCI smoothness of 5-6. After powder coating, the coated part is sanded with a veneer segmented platen sander and wide orbital machine sander operated in tandem. An abrasive grit sequence is followed with the corresponding piece of equipment as represented in FIG. 15.

However, unlike example 1, this part is left without the application of a clear liquid top coat. The resulting part has a PCI smoothness of 9-10; however, the gloss level cannot be controlled and the finish is chalky. It would not hold up to any end-product use without further surface treatment, and has no discernible finish depth. While the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

The invention claimed is:

1. A powder coated article having enhanced visual and tactile smoothness, the article comprising:
a substrate of a desired size and shape;
a cured powder coat surface coating overlying the substrate;
a cured liquid top coat overlying the powder coat surface coating; and wherein a resulting finish has improved PCI smoothness and improved visual and tactile smoothness as compared to another powder coated article without the cured liquid top coat.

2. The powder coated article as claimed in claim 1, wherein the substrate contains a wood product and is selected from a group consisting of wood, medium-density fiberboard (MDF) and high-density fiberboard (HDF).

3. The powder coated article as claimed in claim 1, wherein the powder coat surface coating is at least 5 mils in thickness and has a PCI smoothness of at least 6.

4. The powder coated article as claimed in claim 1, wherein the powder coat surface coating comprises an ultraviolet cured powder coating material, a thermoplastic powder coating material, thermoset powder coating material, or UV polymer powder coating material.

5. The powder coated article as claimed in claim 1, wherein the cured liquid top coat comprises a pre-catalyzed lacquer, a post-catalyzed conversion varnish or comprises an incorporated color pigment.

6. The powder coated article as claimed in claim 1, wherein, the cured liquid topcoat has a PCI smoothness of at least 8.

7. A powder coated article of manufacture, comprising:
a substrate of a desired size and shape;
an inner coating layer of fused powder coating overlying and bonded to the substrate; and
an outer coating layer of cured liquid finish overlying and bonded to the layer of powder coating.

8. The powder coated article of manufacture as claimed in claim 7, wherein the inner coating layer has a thickness of at least 5 mils and a PCI smoothness of at least 6.

9. The powder coated article of manufacture as claimed in claim 7, wherein the outer coating layer has a PCI smoothness of at least 8.

10. The powder coated article of manufacture as claimed in claim 7, wherein the substrate contains a wood product and is selected from a group consisting of wood, medium-density fiberboard (MDF) and high-density fiberboard (HDF).

11. The powder coated article of manufacture as claimed in claim 7, wherein the powder coat surface coating comprises an ultraviolet cured powder coating material, a thermoplastic powder coating material, thermoset powder coating material, or UV polymer powder coating material.

12. The powder coated article of manufacture as claimed in claim 7, wherein the cured liquid top coat comprises a pre-catalyzed lacquer, a post-catalyzed conversion varnish or comprises an incorporated color pigment.

* * * * *

UNITED STATES PATENT AND TRADEMARK OFFICE
CERTIFICATE OF CORRECTION

| | |
|---|---|
| PATENT NO. | : 11,033,932 B2 |
| APPLICATION NO. | : 15/931210 |
| DATED | : June 15, 2021 |
| INVENTOR(S) | : Craig A. Martin et al. |

It is certified that error appears in the above-identified patent and that said Letters Patent is hereby corrected as shown below:

On the Title Page

Column 1, delete "(60) continuation" and insert --(63) continuation--

Signed and Sealed this
Third Day of May, 2022

Katherine Kelly Vidal
*Director of the United States Patent and Trademark Office*